United States Patent
Mason

(10) Patent No.: US 10,743,516 B2
(45) Date of Patent: Aug. 18, 2020

(54) LIVESTOCK STRUCTURES AND RELATED METHODS

(71) Applicant: Big Box Dairy LLC, Amarillo, TX (US)

(72) Inventor: Dean Mason, Amarillo, TX (US)

(73) Assignee: Big Box Dairy LLC, Amarillo, TX (US)

( * ) Notice: Subject to any disclaimer, the term of this patent is extended or adjusted under 35 U.S.C. 154(b) by 516 days.

(21) Appl. No.: 15/430,165

(22) Filed: Feb. 10, 2017

(65) Prior Publication Data

US 2018/0228125 A1  Aug. 16, 2018

(51) Int. Cl.

| A01K 1/12 | (2006.01) |
|---|---|
| A01K 1/00 | (2006.01) |
| A01K 5/02 | (2006.01) |
| B01D 53/14 | (2006.01) |

(52) U.S. Cl.
CPC ............. *A01K 1/12* (2013.01); *A01K 1/0052* (2013.01); *A01K 1/0076* (2013.01); *A01K 5/0266* (2013.01); *B01D 53/1487* (2013.01); *B01D 2257/7025* (2013.01); *B01D 2258/06* (2013.01)

(58) Field of Classification Search
CPC ...... A01K 1/12; A01K 1/0052; A01K 1/0076; A01K 1/00; A01K 1/0047; A01K 1/0058; A01K 5/0266
See application file for complete search history.

(56) References Cited

U.S. PATENT DOCUMENTS

| 1,730,645 | A | 10/1929 | Cory | 414/267 |
| 1,981,418 | A | 11/1934 | Kreutzer | 119/436 |
| 2,358,000 | A | 9/1944 | Cornell | |
| 3,059,616 | A | 10/1962 | Cline | |
| 3,556,055 | A | 1/1971 | Wenger | |
| 3,699,922 | A | 10/1972 | Holm | |
| 4,355,568 | A | 10/1982 | Steckley | |
| 4,986,469 | A | 1/1991 | Sutton, Jr. | 236/49.3 |
| 5,259,334 | A | 11/1993 | Peacock | |
| 5,361,722 | A | 11/1994 | Tecza | |
| 5,666,905 | A | 9/1997 | Mackin et al. | 119/448 |
| 5,960,738 | A | 10/1999 | Sanford | 119/14.45 |
| 6,779,484 | B2 | 8/2004 | Guo | |
| 8,490,576 | B2 | 7/2013 | Ahrens | |

(Continued)

OTHER PUBLICATIONS

International Search Report and Written Opinion issued in International Patent Application No. PCT/US18/17678, dated Jul. 20, 2018.

*Primary Examiner* — Monica L Barlow
*Assistant Examiner* — Aaron M Rodziwicz
(74) *Attorney, Agent, or Firm* — Norton Rose Fulbright US LLP

(57) ABSTRACT

Some embodiments of the present livestock structures comprise a floor, wherein the floor is configured to support livestock housing; a roof, wherein a majority of the roof is substantially parallel to the floor; and one or more supporting structures configured to support the roof; in some embodiments, the floor comprises a non-zero slope. Some embodiments of the present livestock structures comprise a passageway extending a majority of a distance between a first side and an opposing second side of the structure, wherein the passageway is positioned at an elevation that is below an elevation of the floor.

26 Claims, 10 Drawing Sheets

(56) References Cited

U.S. PATENT DOCUMENTS

| | | |
|---|---|---|
| 9,675,043 B2 | 6/2017 | Eriksson |
| 2003/0009955 A1 | 1/2003 | Sellers |
| 2003/0154925 A1* | 8/2003 | Van Den Berg ........ A01J 5/003 |
| | | 119/14.02 |
| 2004/0011294 A1 | 1/2004 | Guo |
| 2006/0118058 A1* | 6/2006 | Moore, Jr. ........... A01K 1/0047 |
| | | 119/448 |
| 2010/0064978 A1 | 3/2010 | Hoefling et al. ............. 119/436 |
| 2010/0116211 A1 | 5/2010 | Sundborger ............... 119/14.02 |
| 2010/0186319 A1 | 7/2010 | Magee ........................ 52/173.2 |
| 2010/0300362 A1 | 12/2010 | Danneker et al. |
| 2011/0146582 A1 | 6/2011 | Lemmon et al. |
| 2011/0155066 A1 | 6/2011 | Leyrit |
| 2012/0097107 A1 | 4/2012 | Torgerson et al. |
| 2013/0052935 A1 | 2/2013 | Priest et al. .................. 454/338 |
| 2014/0096719 A1 | 4/2014 | Klocke |
| 2014/0338539 A1* | 11/2014 | Park ...................... B01D 53/18 |
| | | 96/324 |
| 2015/0282451 A1* | 10/2015 | Kuennen ............... F24F 3/1603 |
| | | 95/154 |
| 2015/0342140 A1 | 12/2015 | Obermuller |
| 2016/0183493 A1 | 6/2016 | Waybright |
| 2016/0366849 A1* | 12/2016 | Mason .................... A01K 1/12 |

* cited by examiner

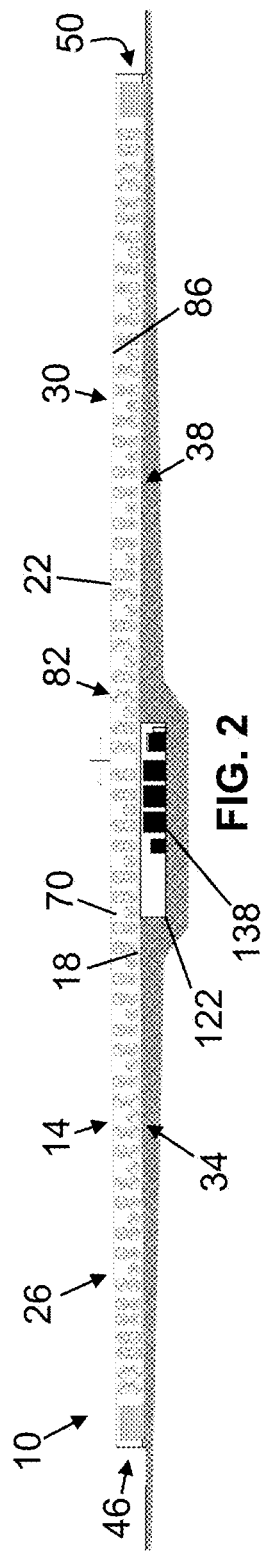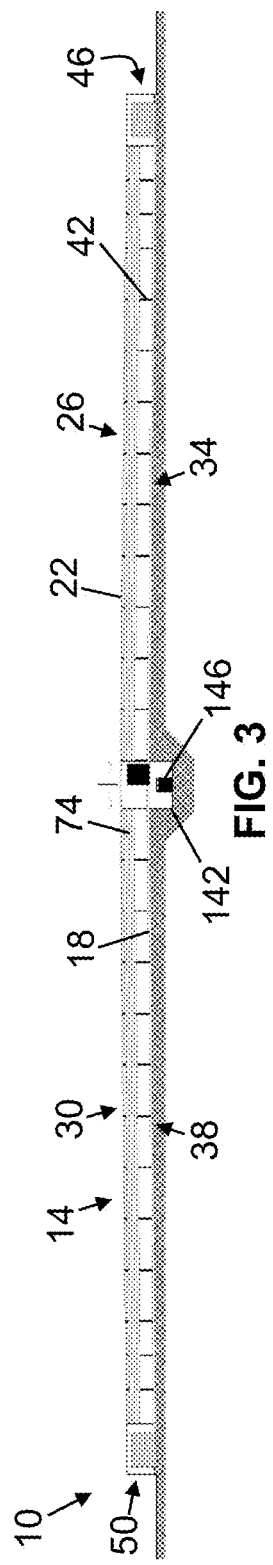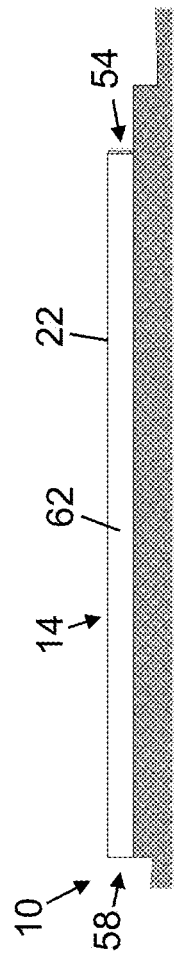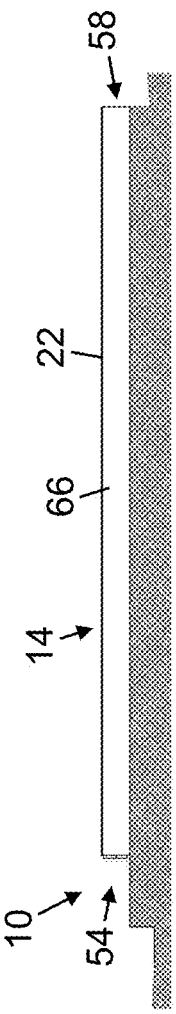

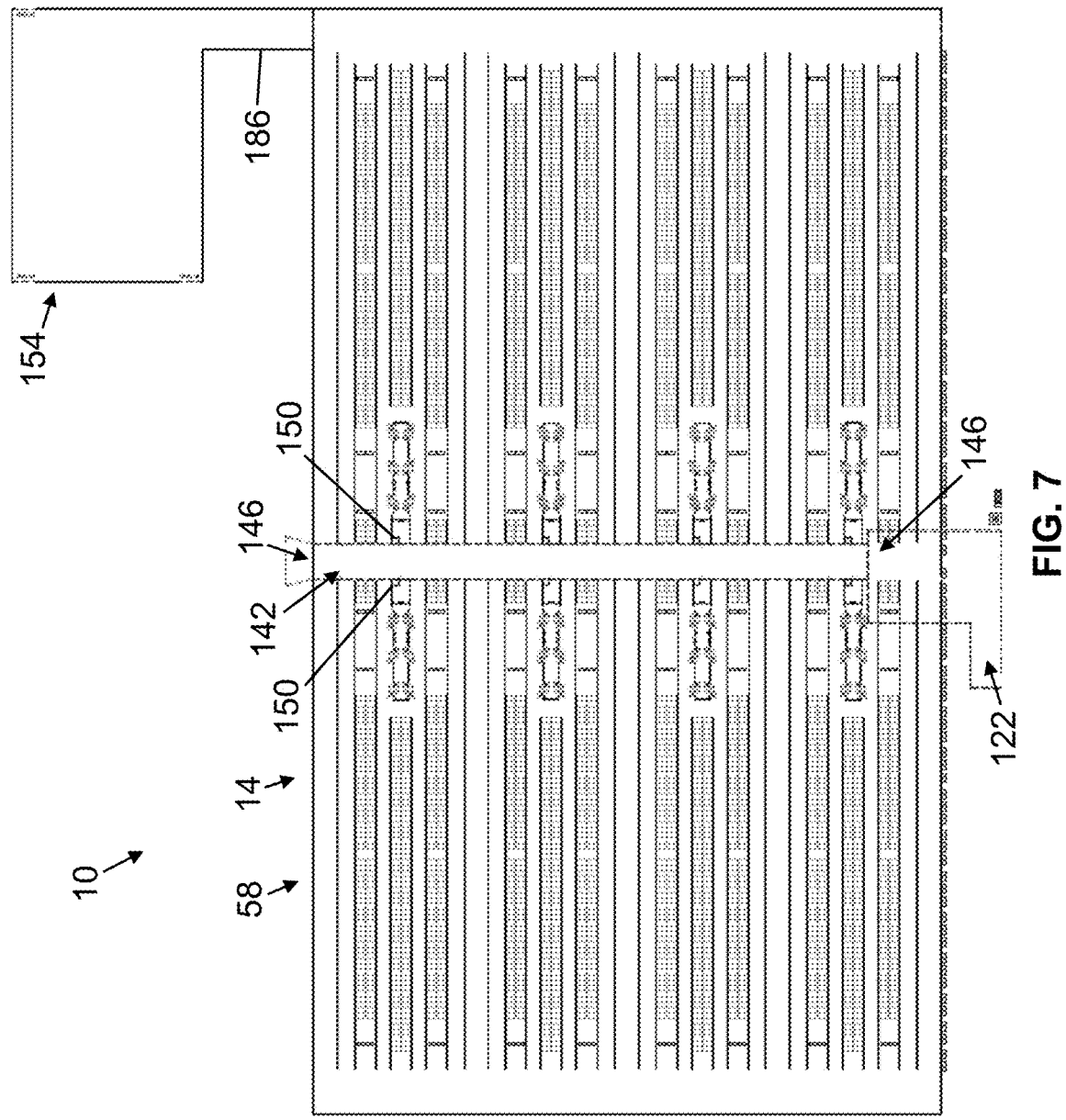

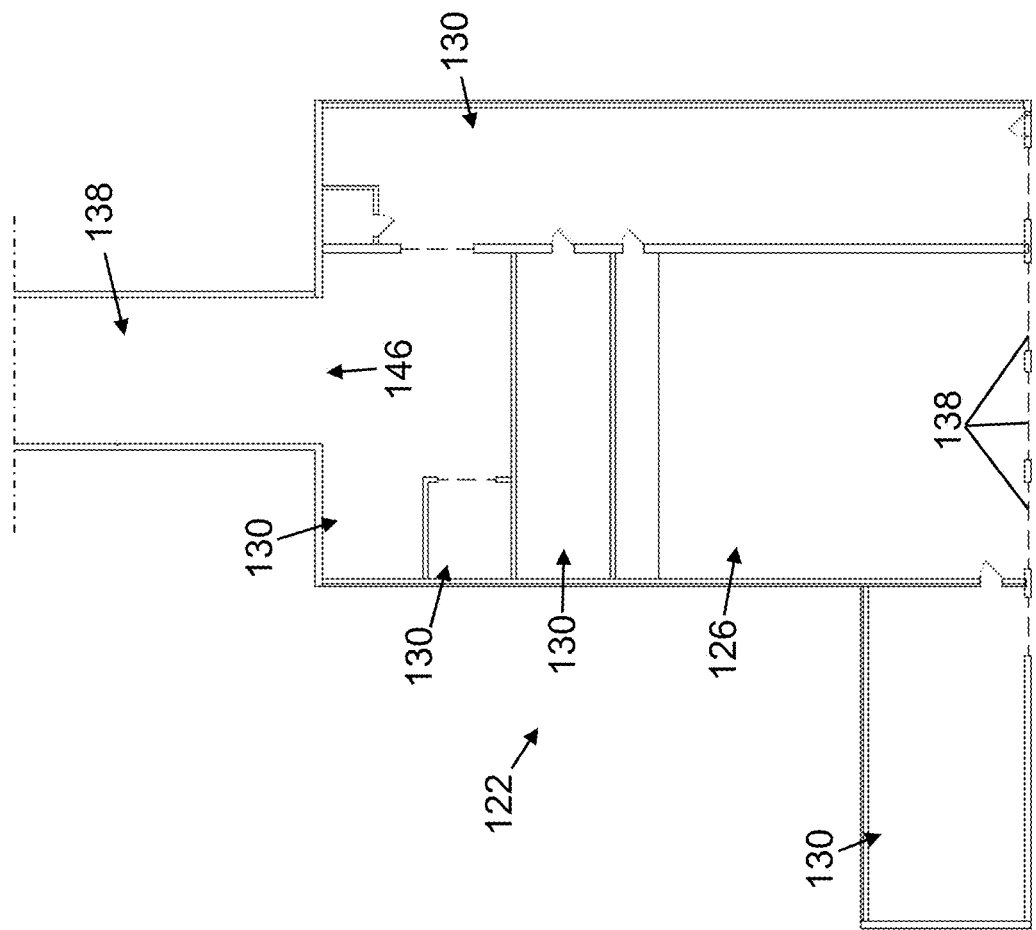

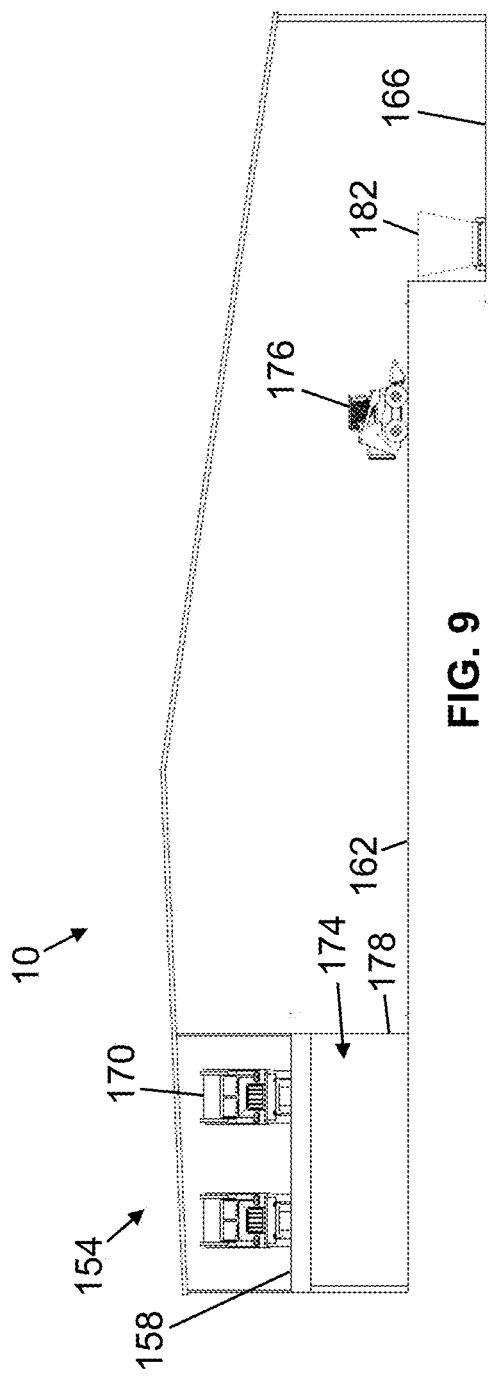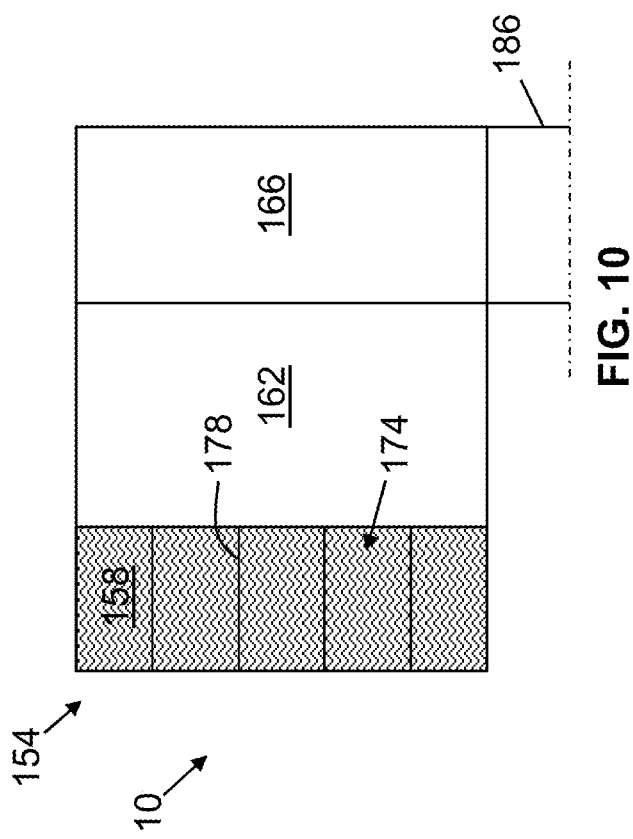

LIVESTOCK STRUCTURES AND RELATED METHODS

BACKGROUND

1. Field of the Invention

The present invention relates generally to livestock structures and methods, such as those, for example, for accommodating and/or milking livestock.

2. Description of Related Art

Examples of livestock structures can be found, for example, at U.S. Pat. No. 4,986,469 and U.S. Patent Publication No. 2013/0052935.

SUMMARY

The structures of this disclosure, and features thereof, provide numerous efficiencies and advantages over preexisting structures. As will be described in detail below, the present structures can accommodate large numbers of livestock (e.g., cows, goats, sheep, hogs, poultry, camels, and the like) due to the size of the structures. For example, in some embodiments, one to 100,000 head of livestock, or more, can be accommodated and/or milked (if applicable) in the present structures. The unique features of the present structures enable large numbers of livestock to eat, drink, sleep, and, if applicable, be milked, while maintaining desired air conditions, such as, air velocity, temperature humidity, dew point, and/or the like throughout the structure to provide the necessary comfort to the livestock. For example, desired air conditions, such as temperature, may vary based on season and/or geography, and, in some instances, air conditions can be maintained such that an air temperature within a structure is from 66 degrees Fahrenheit to 78 degrees Fahrenheit, and, more specifically, at approximately 72 degrees Fahrenheit.

Some embodiments of the present livestock structures comprise a floor, wherein the floor is configured to support livestock housing; a roof, wherein a majority of the roof is substantially parallel to the floor; and one or more supporting structures configured to support the roof.

In some embodiments, the floor comprises a non-zero slope. In some embodiments, the floor includes a first portion having a first slope and a second portion having a second slope. In some embodiments, the first slope and the second slope are substantially equal and extend in opposite directions. In some embodiments, one of the first slope and the second slope comprises 0.1 to 0.25 percent of slope.

Some embodiments of the present livestock structures comprise an air management system to provide ventilation to the structure. Some embodiments of the present livestock structures comprise a plurality of fans configured such that, when activated, the plurality of fans remove air from the structure. In some embodiments, the plurality of fans are configured to cause air to flow into the structure. Some embodiments of the present livestock structures comprise a heating and/or cooling element configured to heat and/or cool air that flows into the structure. Some embodiments of the present livestock structurers comprise an air scrubber configured to separate methane from air removed from the structure by the plurality of fans. In some embodiments, the air scrubber is configured to direct air suitable for breathing into the structure. In some embodiments, the heating and/or cooling element is configured to heat and/or cool the air suitable for breathing. In some embodiments, the methane is directed to an air unit that is configured to at least partially power the heating and/or cooling element and/or the plurality of fans. Some embodiments of the present livestock structures comprise a blower configured to urge air removed by the plurality of fans to the air scrubber.

Some embodiments of the present livestock structures comprise a passageway extending a majority of a distance between a first side and an opposing second side of the structure, wherein the passageway is positioned at an elevation that is below an elevation of the floor. In some embodiments, the passageway comprises a height from 2 feet to 20 feet; and a width from 4 feet to 300 feet. Some embodiments of the present livestock structures comprise a basement configured to accommodate at least a portion of one or more vehicles. In some embodiments, the basement is positioned at an elevation that is below the elevation of the floor. In some embodiments, the passageway is positioned at substantially the same elevation as the basement.

Some embodiments of the present livestock structures comprise a plurality of milking parlors on the floor, and wherein the plurality of milking parlors are positioned at least partially beneath the roof. In some embodiments, the passageway is configured to provide access to one or more of the plurality of milking parlors on the floor. In some embodiments, the passageway is sized to accommodate one or more humans such that the human can access the milking parlors via the passageway.

Some embodiments of the present livestock feeding systems comprise a structure having: a floor, wherein the floor is configured to support livestock housing; a roof, wherein a majority of the roof is substantially parallel to the floor; and one or more supporting structures configured to support the roof; one or more feed delivery vehicles; and a guide track coupled to a portion of the roof that is substantially parallel to the floor, wherein the guide track is configured to guide movement of the one or more feed delivery vehicles about the floor.

In some embodiments, the one or more feed delivery vehicles are coupled to the guide track while the guide track guides movement of the one or more feed delivery vehicles about the floor. In some embodiments, the guide track is configured to guide movement of the one or more feed delivery vehicles along a predetermined path about the floor. In some embodiments, the guide track is configured to guide movement of the one or more feed delivery vehicles along an improvised path about the floor. In some embodiments, a global positioning system (GPS) is configured to guide movement of the one or more feed delivery vehicles about the floor.

Some embodiments of the present methods of delivering feed comprise loading a feed delivery vehicle with feed, wherein the feed delivery vehicle is configured to deliver feed in a structure, wherein the structure includes: a floor, wherein the floor is configured to support livestock housing; a roof, wherein a majority of the roof is substantially parallel to the floor; one or more supporting structures configured to support the roof; and a guide track coupled to a portion of the roof that is substantially parallel to the floor; coupling the feed delivery to the guide track; and guiding movement of the feed delivery vehicle along guide track while the feed delivery truck remains coupled to the guide track and while the guide track remains coupled to the portion of the roof that is substantially parallel to the floor.

Some embodiments of the present methods comprise guiding movement of the feed delivery vehicle along a predetermined path about the floor. Some embodiments of the present methods comprise guiding movement of the feed delivery vehicle along an improvised path about the floor.

Some embodiments of the present structures comprise a commodity portion having: a delivery platform configured to accommodate one or more vehicles; a loader platform comprising one or more bays, each of which are configured to be at least partially disposed beneath the delivery platform and are configured to receive product from the one or more vehicles on the delivery platform; and a mixing platform configured to support one or more mixers, wherein the mixing platform is disposed at an elevation below an elevation of the loader platform.

In some embodiments, the product includes animal fodder. In some embodiments, each bay is separated from an adjacent bay by a partition. In some embodiments, the partition extends from the loader platform to the delivery platform. In some embodiments, the mixing platform is laterally spaced from the delivery platform.

Some embodiments of the present structures comprise a livestock portion that includes: a floor, wherein the floor is configured to support livestock housing; a roof, wherein a majority of the roof is substantially parallel to the floor; and one or more supporting structures configured to support the roof. In some embodiments, the livestock portion and the commodity portion of the structure are coupled via a commodity passageway. In some embodiments, the commodity passageway is isolated from air outside of the structure.

The term "coupled" is defined as connected, although not necessarily directly, and not necessarily mechanically. Two items are "couplable" if they can be coupled to each other. Unless the context explicitly requires otherwise, items that are couplable are also decouplable, and vice-versa. One non-limiting way in which a first structure is couplable to a second structure is for the first structure to be configured to be coupled (or configured to be couplable) to the second structure. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a system, or a component of a system that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

Any embodiment of any of the present systems and methods can consist of or consist essentially of—rather than comprise/include/contain/have—any of the described elements and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. At least some of the figures depict graphical symbols or representations that will be described in the specification and/or understood by those of ordinary skill in the art. The figures are drawn to scale, unless indicated otherwise.

FIGS. 2-5 depict front, back, first, and second sides, respectively, of the structure of FIG. 1.

FIG. 7 depicts a top view of the structure of FIG. 1, shown with a commodity portion, a passageway, and a basement.

FIG. 8 depicts a floor layout of the basement of FIG. 7.

FIGS. 9 and 10 depict a side view and a top view, respectively, of an embodiment of a commodity portion suitable for use with some embodiments of the present structures.

DESCRIPTION OF ILLUSTRATIVE EMBODIMENTS

Figure 1:
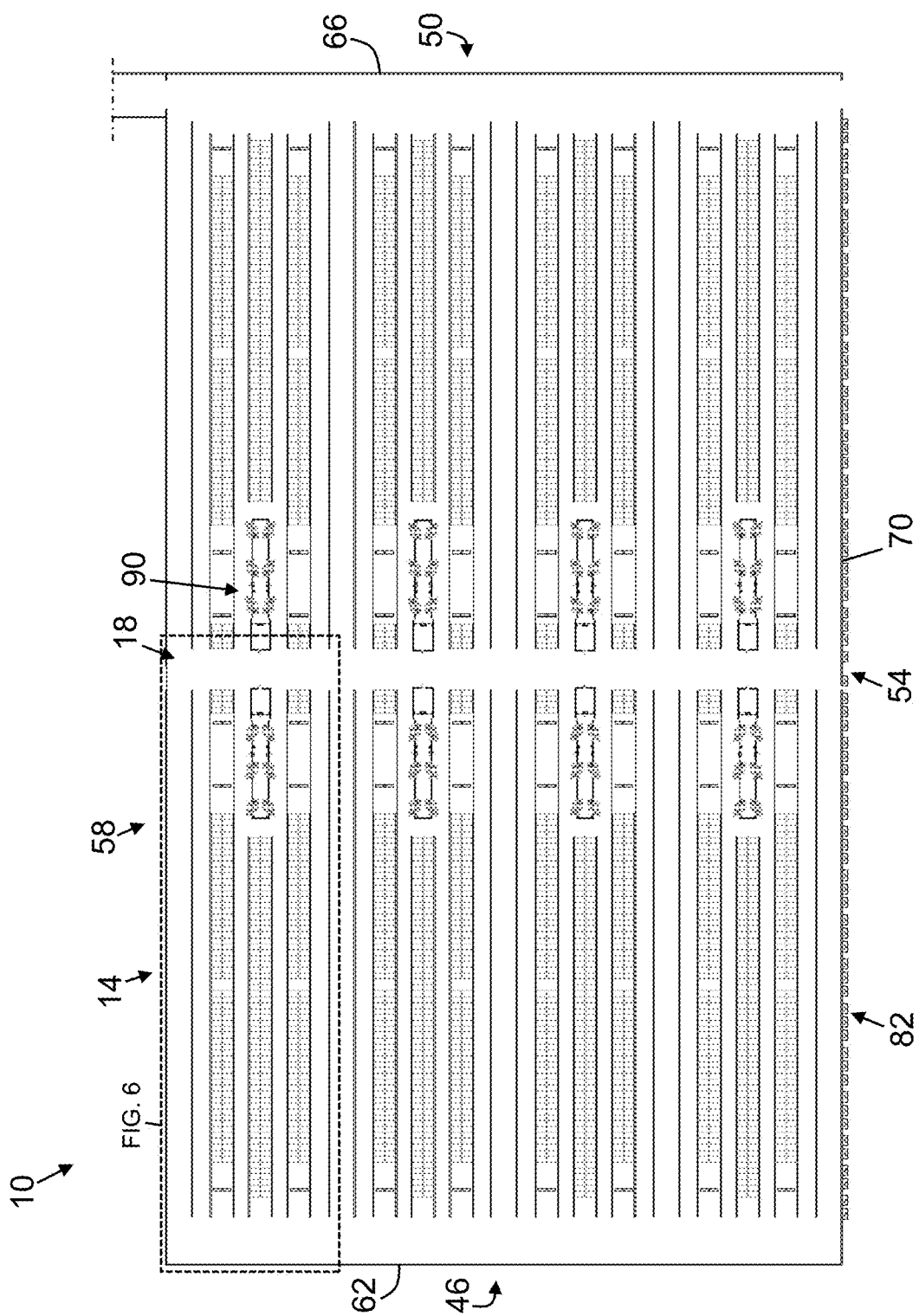
FIG. 1 depicts a top view of one embodiment of the present structures, shown with a roof hidden.

The present structures can be constructed independently or in connection with designs of existing structures. Further, at least some existing structures can be modified or supplemented to comprise one or more features of the structures described in this disclosure.

The novel structures (e.g., 10, 10a, 10b) and related methods described herein can be designed to accommodate large numbers of livestock and can be configured such that livestock housing, veterinary care, milk extraction, milk processing, milk loading, milk storage, feed delivery, utility management, and/or other functions are maintained within the single structure. By providing one or more of these accommodations and/or functions within a single structure, an overall footprint of the structure can be minimized. As described in further detail herein, the positioning of one or more of these important operational functions within the structure and/or the physical features of the present structures and the related methods can be configured to provide improved operational efficiencies, such as, efficiencies in cooling and/or heating air within the structure, efficiencies in precipitation collection, efficiencies in waste management, efficiencies in delivering, loading, and/or mixing commodity from a delivery vehicle and/or efficiencies in constructing the structure. The positioning of one or more of these numerous important operational functions within the structure and/or the physical features of the present structures and the related methods described herein can also result in reduced human interaction with livestock, thereby improving livestock comfort, which is important to a profitable, well-run livestock operation. Further, the physical features of the present structures and the related methods allow for the structures to be built on previously unsuitable typography.

Referring now to FIGS. 1-11, shown therein and represented by numeral 10 is one embodiment of the present structures. In the embodiment shown, structure 10 comprises a livestock portion 14 having a floor 18 and a roof 22. According to the present invention, at least a portion of roof 22 is configured to be substantially flat relative to a portion of floor 18 positioned beneath that portion of the roof. By configuring at least a portion of roof 22 to be substantially flat relative to the corresponding floor section, the air volume within livestock portion 14 is reduced, as compared to prior art structures, such as those structures having gabled roofs. This reduced air volume thereby increases efficiencies in cooling and/or heating air within livestock portion 14. To illustrate, by configuring at least a portion of roof 22 to be substantially flat, warm air, which tends to rise within livestock portion 14, can remain closer to floor 18, thereby reducing a risk of frost development within the livestock portion in cold weather conditions.

In the depicted embodiment, roof 22 includes a first portion 26 and a second portion 30. First portion 26 of roof 22 is configured to be substantially flat such that the first portion of the roof is substantially parallel relative to a first portion 34 of floor 18 that is below the first portion of the roof. Similarly, second portion 30 of roof 22 is configured to be substantially flat such that the second portion of the roof is substantially parallel relative to a second portion 38 of floor 18 that is below the second portion of the roof. A portion of a roof (e.g., 22) may be "substantially parallel" to a corresponding portion of a floor (e.g., 18) if a slope the portion of the roof is within five (5) percent of slope (e.g., any one of 0.5, 1, 1.5, 2, 2.5, 3, 3.5, 4, 4.5, or 5 percent of slope) of a slope of the corresponding portion of the floor. In the depicted embodiment, at least a portion of roof 22 can be configured to occupy substantially the same plane. For example, first portion 26 of roof 22 occupies substantially the same plane. Similarly, second portion 30 of roof 22 occupies substantially the same plane. In some embodiments, a majority of a roof (e.g., 22), such as the entire roof, can be configured to occupy substantially the same plane.

In this embodiment, at least a portion, e.g., first portion 26 and/or second portion 30, of roof 22 can be configured to include a slope relative to horizontal. For example, first portion 26 of roof 22 comprises a first slope. Second portion 30 of roof 22 comprises a second slope. As shown, first portion 26 and second portion 30 of roof 22 can have substantially equal slopes, e.g., though extending in opposite directions. In some embodiments, a first portion (e.g., 26) and a second portion (e.g., 30) of a roof (e.g., 22) can have unequal slopes. In this embodiment, one or more portions, e.g., first portion 26 and/or second portion 30, of roof 22 can have any suitable slope relative to horizontal, such as, approximately any one of, greater than approximately any one of, or between any two of, the following: 0, 0.1, 0.15, 0.2, 0.25, 0.3, 0.35, 0.4, 0.45, 0.5, 0.6, 0.7, 0.8, 0.9, 1.0, 1.1, 1.2, 1.3, 1.4, 1.5, 1.6, 1.7, 1.8, 1.9, 2.0, 2.25, 2.5, 2.75, 3, 3.5, 4, 4.5, 5, 6, 7, 8, 9, 10, and 15 percent of slope. Slope of roof 22 can be measured using any suitable device, such as, a slope laser and/or a global positioning system (GPS).

These sloped portions of roof 22 can be configured to achieve the additional advantage of encouraging precipitation, e.g., rain, snow, and/or the like, and/or debris, e.g., leaves, branches, and/or the like, that is on the roof to move off of the roof. Livestock portion 14 may comprise a precipitation collection system configured to collect precipitation that has collected on roof 22. By collecting precipitation from roof 22, a risk of collecting contaminated fluid is reduced, e.g., as, for example, compared to collecting fluid that is permitted to fall from the roof onto, for example, floor 18 and/or ground. Fluid collected by such a precipitation collection system can be reused, e.g., for consumption by livestock, for consumption by personnel, for cooling equipment, and/or the like.

Roof 22 can comprise one or more suitable materials such that the roof can exhibit a variety of preferable performance characteristics. These characteristics include the capacity to endure various weather conditions, e.g., such as heat, precipitation, frost, wind, and/or the like, exhibiting a suitable strength, e.g., to bear a load on the roof. In addition, the roof may have a suitable surface area, e.g., to protect floor 18 from various weather conditions and/or have a suitable slope, e.g., to encourage precipitation and/or debris to move off roof, and/or the like. As an example of material selection, roof 22 can comprise one or more of the following materials, e.g., that can be used individually or arranged together in two or more layers, such as: thermoplastic polyolefin (TPO) roofing, oriented strand board (OSB), metal decking, insulation, cold-rolled purlin, carrier beam, bar joist, scissor truss, laminated beam, and/or the like materials. In some embodiments, a roof (e.g., 22) may comprise an insulation that is not exposed to a floor (e.g., 18) such that, if a portion of the insulation breaks apart from the rest of the insulation, the broken portion of insulation is prevented from falling onto the floor and/or falling onto livestock on the floor.

In the depicted embodiment, at least a portion of floor 18 can be configured to occupy substantially the same plane. For example, first portion 34 of floor 18 occupies substantially the same plane. Similarly, second portion 38 of floor 18 occupies substantially the same plane. In some embodiments, a majority of a floor (e.g., 18), such as the entire floor, can be configured to occupy substantially the same plane. Floor 18 can comprise one surface or a combination of surfaces, such as, a natural surface, e.g., such as dirt and/or a man-made surface, e.g., such as concrete.

In this embodiment, at least a portion, e.g., first portion 34 and/or second portion 38, of floor 18 can be configured to include a slope relative to horizontal. For example, first portion 34 of floor 18 can comprise a first slope. Second portion 38 of floor 18 can comprise a second slope. As shown, first portion 34 and second portion 38 of floor 18 can have substantially equal slopes, e.g., though extending in opposite directions. In some embodiments, a first portion (e.g., 34) and a second portion (e.g., 38) of a floor (e.g., 18) can have unequal slopes. In this embodiment, at least a portion, e.g., first portion 34 and/or second portion 38, of floor 18 can be configured to comprise any suitable slope relative to horizontal, such as, approximately any one of, greater than approximately any one of, or between any two of the following: 0, 0.1, 0.15, 0.2, 0.25, 0.3, 0.35, 0.4, 0.45, 0.5, 0.6, 0.7, 0.8, 0.9, 1.0, 1.1, 1.2, 1.3, 1.4, 1.5, 1.6, 1.7, 1.8, 1.9, 2.0, 2.25, 2.5, 2.75, 3, 3.5, 4, 4.5, 5, 6, 7, 8, 9, 10, and 15 percent of slope. Slope of floor 18 can be measured using any suitable device, such as, a slope laser and/or a global positioning system (GPS).

The particular slope of floor 18 can be selected based on one or more livestock factors, such as, a livestock bedding type, type of waste management system(s), and/or the like. To illustrate, a portion of a floor (e.g., 18) having livestock bedding that comprises compost may include a slope that is generally less than a slope of a portion of the floor having livestock bedding that comprises sand. For further example, a portion of a floor (e.g., 18) having a flush waste management system may have a slope that is generally greater than a slope of a portion of the floor having a dry scrape, mechanic scrape, auto scrape, vacuum, and/or the like waste management system. At least because a portion (e.g., first portion 34 and/or second portion 38) of floor 18 comprises a slope, the portion of the floor can be configured to assist with waste management by encouraging waste and other debris to move along the sloped floor.

The particular slope of floor 18 can be selected based on one or more environmental factors, such as, a slope of ground beneath the floor. For example, livestock portion 14 may incorporate an existing slope of ground beneath floor 14 to define a slope of the floor. To illustrate, livestock portion 14 may incorporate an existing slope of ground beneath floor 18 by, for example, building a portion of the livestock portion on a side of a hill. In this illustration, the hill may have a slope of 5 percent of slope relative to horizontal. If a desired slope of a floor (e.g., 18) is 2 percent of slope relative to horizontal, then the floor built on the hill should have a slope of 3 percent of slope relative to the hill, thereby ultimately yielding a floor having a slope of 2 percent of slope relative to horizontal as initially desired. In this way and others, at least a portion of the present structures can be positioned on previously unsuitable topography.

Roof 22 can be at least partially supported by one or more supporting structures 42 (see FIG. 3, for example). In this embodiment, supporting structures 42 can comprise substantially the same length at least because one or more portions of roof 22, e.g., first portion 26 and second portion 30, are configured to be substantially parallel to floor 18. In some embodiments, such as those embodiments wherein one or more portions of a roof (e.g., 22) are non-parallel relative to a floor (e.g., 18), at least some supporting structures (e.g., 42) can be the same length. In this way and others, livestock portion 14 of structure 10 can achieve the additional advantage of increasing construction efficiencies by reducing the number of unique parts required to construct the livestock portion. Supporting structures 42 can comprise any suitable material, such as metal (e.g., aluminum, steel, iron, and/or the like), a composite material (e.g., concrete), and/or the like.

In the embodiment shown, livestock portion 14 includes a first side 46, a second side 50, a front side 54, and a back side 58. First side 46 can comprise a first side wall 62. Second side 50 can comprise a second side wall 66. Front side 54 can comprise a front wall 70. Back side 58 can comprise a back wall 74. In this embodiment, one or more of first side wall 62, second side wall 66, front wall 70, and back wall 74 can be configured to support roof 22. One or more of first side wall 62, second side wall 66, front wall 70, and back wall 74 can comprise any suitable material, such as, metal (e.g., aluminum, steel, iron, and/or the like), concrete, polyester, polyethylene, canvas, and/or the like.

Livestock portion 14 can be configured to control air conditions such as temperature, humidity, air flow, air quality, and/or the like within the livestock portion. In the embodiment shown, at least a portion of back wall 74 can be configured to control air flow (e.g., from outside livestock portion 14) into the livestock portion. For example, back wall 74 can comprise sheeted sidewall, curtain sidewall, louvers, and/or the like that is movable to control the amount of airflow into livestock portion 14. For example, during cool climates, back wall 74 can be moved to cover a majority of back side 58, and thereby restrict airflow into livestock portion 14. Conversely, during warmer climates, back wall 74 can be moved to uncover a majority of back side 58, and thereby allow more airflow into livestock portion 14. In some embodiments, a back wall (e.g., 74) of a livestock portion (e.g., 14) can include one or more openings to control airflow into the livestock portion.

Livestock portion 14 can include any suitable system or combination of systems to control air conditions within the livestock portion. Suitable air management systems include natural ventilation systems and/or forced ventilation systems. A natural ventilation system may use a natural driving force, such as, wind and buoyancy, in combination with sheeted sidewall, curtain sidewall, louvers, and/or the like, to control air conditions within a livestock portion (e.g., 14). On the other hand, a forced ventilation system may use a mechanical driving force, such as one or more fans (e.g., 82), in combination with sheeted sidewall, curtain sidewall, louvers, and/or the like, to control air conditions within a livestock portion (e.g., 14). In some embodiments, a forced ventilation system may comprise an air regulating system (e.g., 206) (described in further detail below), such as a heating, ventilation, and air conditioning (HVAC) system.

In the depicted embodiment, livestock portion 14 can comprise one or more fans 82 (see FIG. 2, for example) positioned on at least one of first side 46, second side 50, front side 54, and back side 58. In the embodiment shown, livestock portion 14 includes one or more fans 82 positioned along front side 54 (e.g., coupled to front wall 70) such that, when the one or more fans are activated, air is removed from the livestock portion by the one or more fans (e.g., by pulling air from within the livestock portion toward the front side of the livestock portion). When one or more fans 82 are activated, the fans may cause air from outside livestock portion 14 to flow into the livestock portion. In this way and others, back side 58 of livestock portion 14 can serve as an air inlet to allow air to enter livestock portion 14 and one or more fans 82 can serve as an air outlet (e.g., the fans can be in fluid communication with an exhaust vent) to allow air to exit the livestock portion. One or more fans 82 can be adjustable such that air velocity, e.g., measured along a direction between first side 46 and second side 50, is substantially uniform. In this way and others, livestock comfort within livestock portion 14 can be maintained regardless of the location of a head of livestock on floor 18.

In some embodiments, a livestock portion (e.g., 14) can be configured to comprise an opening in a roof (e.g., 22) to permit air to enter the livestock portion through the opening such that the air can eventually be removed from the livestock portion by one or more fans (e.g., 82) at a first side (e.g., 46), a second side (e.g., 50), a front side (e.g., 54), and/or a back side (e.g., 58) of the livestock portion. Conversely, in some embodiments, a livestock portion (e.g., 14) can be configured to comprise an opening in a roof (e.g., 22) to permit air to be removed from the livestock portion through the opening by one or more fans (e.g., 82) disposed beneath the opening. Such an opening can be configured to extend substantially parallel to a first side (e.g., 46) and/or a second side (e.g., 50) of such a livestock portion and can extend for at least a portion of a length of the first side and/or the second side (e.g., approximately any one of, or between any two of, 1, 5, 10, 15, 30, 45, 60, 75, 90 and 100 percent of the length of the first side and/or the second side). Additional details regarding such an opening can be found in U.S. patent application Ser. No. 14/996,713 entitled "Livestock Structures and Methods," which is hereby incorporated by reference in its entirety.

In this embodiment, a bottom surface 86 of roof 22 may be substantially flat such that air moving along the bottom surface of the roof, e.g., air moving from moving from back side 58 toward front side 54 of livestock portion 14, minimizes condensation on the bottom surface of the roof. For example, roof 22 can be configured such that bottom surface 86 does not include baffles and/or the like, which may otherwise be required to prevent the propagation of mold, rust, and/or the like and/or to provide sufficient ventilation (e.g., in gabled roofs).

In some embodiments, a livestock portion (e.g., 14) can include misters and/or misting systems configured to introduce mist into the livestock portion (e.g., in front of one or more fans 82) to further cool air within the livestock portion. Such misters and/or misting systems can be configured to include high pressure misters that provide a fine mist, which permits air to be cooled without, for example, saturating the ground and/or livestock bedding materials.

Livestock portion 14 can be sized to accommodate any number of head of livestock, such as, approximately any one of, greater than approximately any one of, or between approximately any two of, the following: 1, 200, 500, 750, 1,000, 2,000, 3,000, 4,000, 5,000, 6,000, 7,000, 8,000, 9,000, 10,000, 15,000, 20,000, 25,000, 30,000, 35,000, 40,000, 45,000, 50,000, 60,000, 70,000, 80,000, 90,000, 100,000, 200,000, 300,000, 400,000, and 500,000 head of livestock. For example, at least one of first side 46, second side 50, front side 54, and back side 58 (e.g., first side wall 62, second side wall 66, front wall 70, and/or back wall 74, respectively) can each comprise a length from approximately 100 feet to 2,500 feet, such as, approximately any one of, greater than approximately any one of, or between any two of the following: 25, 50, 100, 200, 300, 400, 500, 600, 700, 800, 900, 1,000, 1,100, 1,200, 1,300, 1,400, 1,500, 1,600, 1,700, 1,800, 1,900, 2,000, 2,100, 2,200, 2,300, 2,400, 2,500, 3,500, and 5,000 feet.

Livestock portion 14 is configured to accommodate one or more milking parlors 90. Livestock portions 14 of the present disclosure can include any suitable type of milking parlors or combinations of types of milking parlors in order to milk livestock within the livestock portion. For example, milking parlors 90 suitable for use with the present structures 10 and methods can include any suitable combination of herringbone milking parlors, parallel milking parlors, rotary milking parlors, general retention milking parlors, and/or the like. Any one or more milking parlors 90 can be manually operated and/or robotically operated.

Both herringbone and parallel milking parlors include a first side and a second side. A herringbone parlor positions the livestock, on both sides of the parlor, at a non-perpendicular angle with respect to the parlor (e.g., 30 degrees) during milking. In contrast, a parallel milking parlor positions the livestock, again on both sides of the parlor, at a substantially perpendicular angle relative to the parlor during milking. In contrast to the herringbone and parallel milking parlor designs, a rotary milking parlor includes a substantially circular parlor that typically rotates at a predetermined, adjustable speed. Livestock enter the rotary parlor for milking, and once the rotary parlor has rotated approximately 360 degrees, the livestock exit the rotary parlor. Finally, constituting a newer generation of milking parlors, general retention parlors include a platform and one or more lasers, robotically movable arms, brushes and/or suction cups to provide sanitation, milking, and/or the like with little or no human intervention. All of the above milking parlor types can accommodate numerous heads of livestock. Typical designs can accommodate from ten or more heads to more than one hundred and fifty (150) or more heads of livestock and all numbers in between.

In this embodiment, each milking parlor 90 can be disposed between first side 46 (e.g., first side wall 62) and second side 50 (e.g., second side wall 66), and between front side 54 (e.g., front wall 70) and back side 58 (e.g., back wall 74). By disposing one or more milking parlors (e.g., 90) within a single livestock portion (e.g., 14), the length of material needed for utility conduits, such as, milk lines, wash lines, communication lines, and/or the like is reduced.

In this embodiment, each milking parlor 90 includes one or more milking stations 94 (see FIG. 6, for example) configured to robotically milk livestock. For example, each milking parlor 90 can include six (6) milking stations 94. In some embodiments, one or more milking parlors (e.g., 90) of a livestock portion (e.g., 14) can be sized to include 1, 2, 3, 4, 5, 6, 7, 8, 9, 10, 20, 30, 40, 50, 60, 70, 80, 90, 100 or more milking stations (e.g., 94). In this embodiment, each milking station 94 is at least partially disposed within an enclosure 98 such that one or more components of the milking station are isolated from livestock to provide conditions that are sanitary, safe, and/or compliant with regulatory code. While each milking station 94 herein is shown as being static (e.g., immovable relative to enclosure 98), in some embodiments, one or more milking stations (e.g., 94) can be movable about livestock portion 14. For example, in some embodiments, one or more milking stations (e.g., 94) can be brought to livestock such that milk extraction can be conducted anywhere within a livestock portion (e.g., 14), such as, in a livestock bed (e.g., 102), in a feed lane (e.g., 106), in a walking lane (e.g., 110), in a holding pen (e.g., 118), and/or the like.

Figure 6:
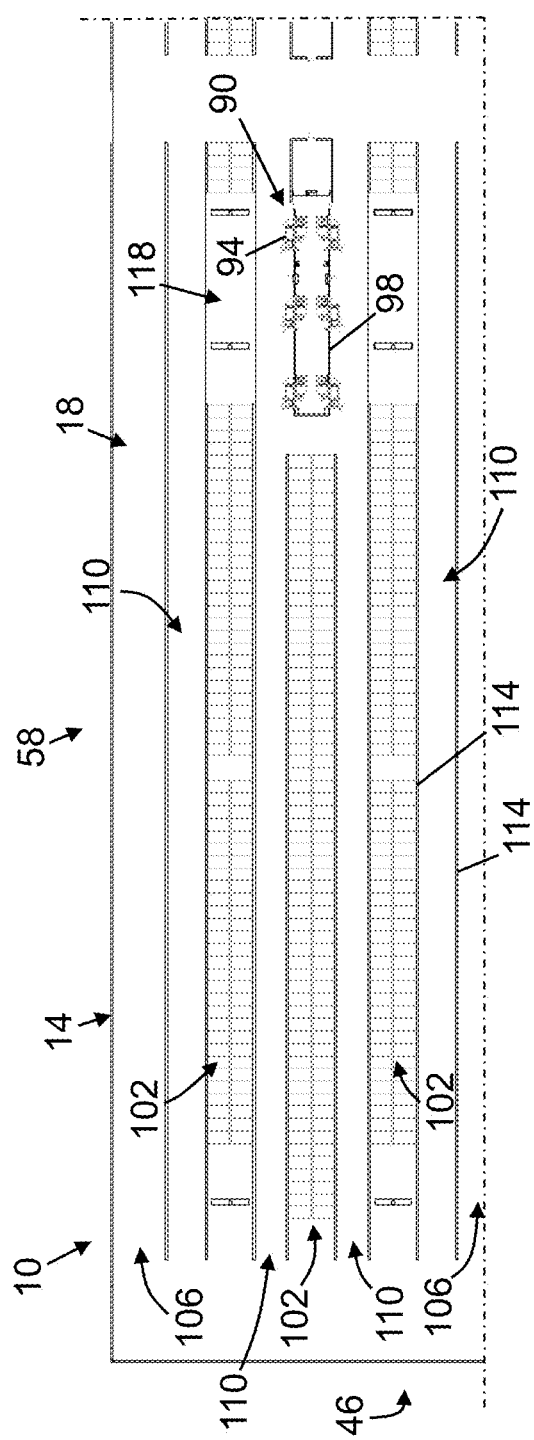
FIG. 6 depicts a magnified view of a portion of the structure of FIG. 1.
Figure 11:
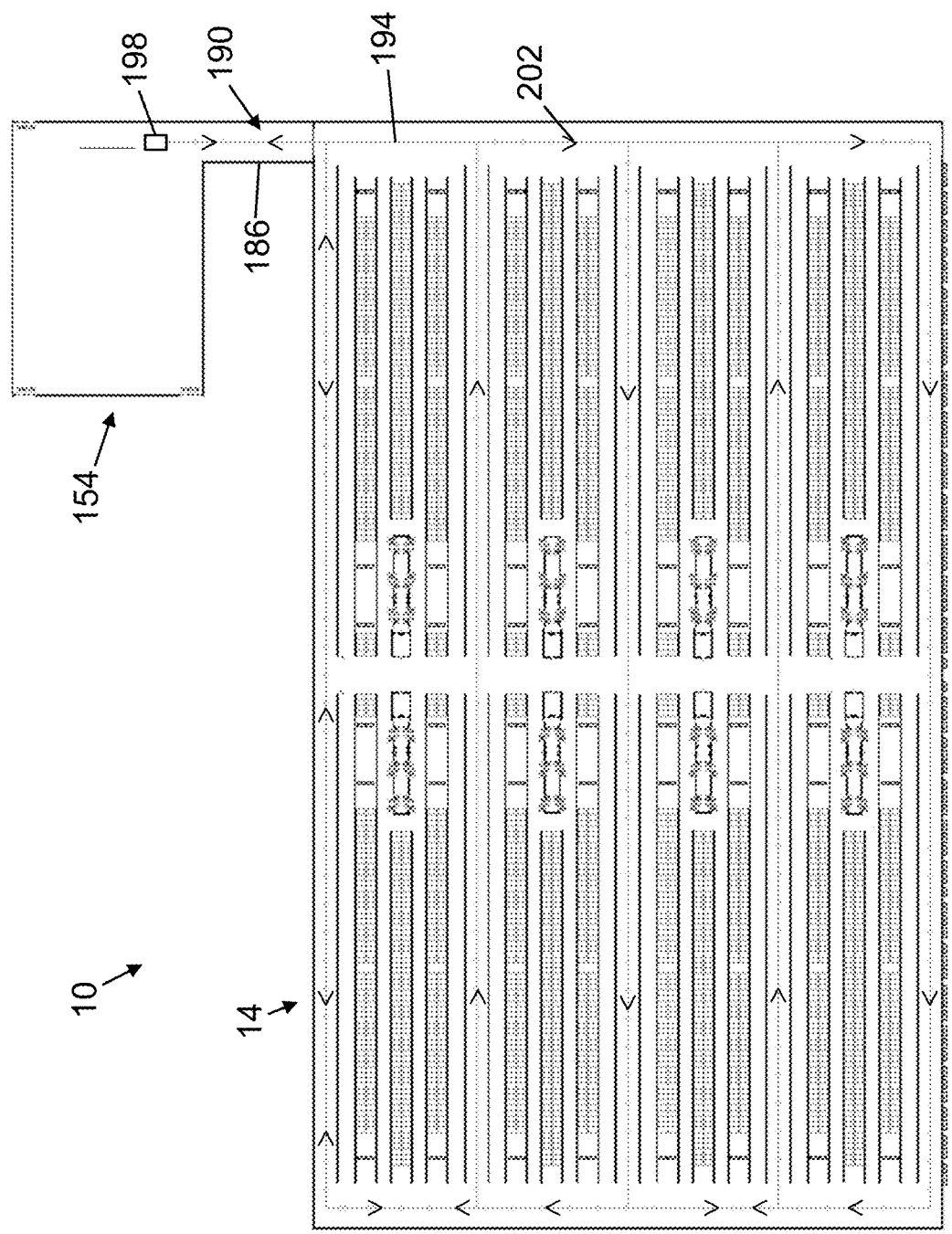
FIG. 11 depicts the structure of FIG. 1, shown with a feed delivery system that is suitable for use with some embodiments of the present structures.

Livestock portion 14 comprises a plurality of livestock beds 102 (see FIG. 6, for example). As shown, livestock beds 102 may be arranged in one or more rows. Each livestock bed 102 can be configured to accommodate a head of livestock such that the head of livestock can rest and/or sleep in the livestock bed. Livestock portion 14 can be configured to include one or more feed lanes 106. Each feed lane 106 may be sized to accommodate an automated feed delivery system, such as, a feed delivery vehicle (e.g., 198, see FIG. 11), a feed conveyor belt, and/or the like, which moves through one or more feed lanes to deposit feed for consumption by the livestock as discussed in further detail below.

In this embodiment, livestock portion 14 comprises a plurality of walking lanes 110 (see FIG. 6, for example). Each walking lane 110 is configured to allow livestock to safely move about livestock portion 14 (e.g., along a path defined by the walking lane). For example, each walking lane 110 may comprise a slip-resistant (e.g., grooved, textured, and/or the like) material comprising any suitable material, such as, one or more of the following: concrete, rubber, dirt, sand, hay, and/or the like. As shown, walking lane 110 can be disposed between two rows of livestock beds 102 and/or between a row of livestock beds and feed lane 106.

Livestock beds 102, walking lanes 110, and/or feed lanes 106 may each be separated by one or more partitions 114. For example, one or more partitions 114 can be configured to allow a head of livestock to move between livestock bed 102 and walking lane 110 and/or prevent the head of livestock from moving between the walking lane and feed lane.

In this embodiment, livestock portion 14 can be configured to include one or more holding pens 118. Each holding pen 118 may be configured to temporarily hold one or more head of livestock (e.g., in preparation for milking in milking parlor 90). Each holding pen 118 can be configured to allow a head of livestock access to at least a portion of milking parlor 90, such as, to one or more milking stations 94 of the milking parlor. As shown, each holding pen 118 is configured to allow a head of livestock access to three (3) of the six (6) milking stations 94 of milking parlor 90. In some embodiments, each holding pen (e.g., 118) of a livestock portion (e.g., 14) is configured to allow a head of livestock access to any suitable number of milking stations (e.g., 94) of a milking parlor (e.g., 90), such as, 1, 2, 3, 4, 5, 6, 7, 8, 10, 15 or more milking stations. By allowing one or more holding pens 118 access to respective milking parlors 90, livestock portion 14 is capable of milking a larger number of livestock (e.g., as compared to a single centralized milking parlor exposed to a single holding pen).

In this embodiment, a head of livestock can freely move between (e.g., have effectively unlimited access to) a livestock bed (e.g., 102), a walking lane (e.g., 110), a holding pen (e.g., 118), and/or a milking parlor (e.g., 90) such that the head of livestock can decide when to eat, drink, rest, and/or be milked. For example, distinguishable from a livestock portion where cows are gathered in large groups (e.g., three or more livestock at a time) to a milking parlor to be milked, the livestock in the present livestock portions can stay in their respective livestock beds 102 and, under their own free will, can walk to milking parlor 90 (e.g., accessible via walking lane 110) to be milked. For further example, a head of livestock can voluntarily leave livestock bed 102 and walk toward feed lane 106, where the head of livestock can consume feed that is in the feed lane.

Livestock portion 14 can also include a basement 122. For example, basement 122 of livestock portion 14 depicted in FIG. 8 is one example of a basement layout. In this embodiment, basement 122 comprises one or more rooms wherein milk can be collected, cooled, prepared for transport or storage, preliminarily processed (e.g., by basic filtration), prepared for further processing and/or the like. Basement 122 may also comprise one or more rooms wherein administrative operations can be conducted. As used herein, a "room" may be used to describe a space that is isolated by three or more walls which may extend between a floor and a ceiling of the room. Each room may have an opening configured to allow personnel access into the room.

As shown, basement 122 comprises a loading room 126, discussed in further detail below. In the depicted embodiment, basement 122 comprises one or more utility rooms 130 configured to comprise equipment for controlling one or more of the following systems: milk wash systems, cooling systems, purification systems, filtration systems, electrical control systems, vacuum systems, and/or the like. By having one or more utility rooms 130 dedicated to controlling one or more respective systems of livestock portion 14 (e.g., a fluid control room having controls for controlling fluid flow throughout the livestock portion, an electrical control room having controls for controlling electricity throughout the livestock portion, and/or the like) personnel can quickly control one more systems of the livestock portion from a single, centralized location. Further, by having one or more utility rooms 130 dedicated to controlling one or more respective systems of livestock portion 14, basement 122 prevents cross-contamination between electricity (e.g., in a utility room 130 for controlling electricity) and fluid (e.g., in in a utility room 130 for controlling fluid flow).

Basement 122 may be positioned at an elevation below floor 18 of livestock portion 14. Distinguishable from an area that is at an elevation below the elevation at which livestock is milked (e.g., elevation of milking parlor (e.g., 90)), but at the substantially same elevation or at an elevation above a floor (e.g., 18) of a livestock portion (e.g., 14), basement 122 is positioned beneath both floor 18 and milking parlors 90 of livestock portion 14. In the depicted embodiment, because milking parlors 90 are positioned at an elevation above basement 122, gravity tends to assist milk flow from the milking parlors to the basement. In some embodiments, one or more pumps can (e.g., also) assist in enabling milk to pass from one or more milking parlors (e.g., 90) to a basement (e.g., 122). Milk from one or more milking parlors 90 (e.g., with the assistance of gravity and/or one or more pumps) can be directed to a storage tank (e.g., within one or more utility rooms 130).

In this embodiment, basement 122 is configured to be accessible by one or more vehicles 134 (e.g., one, two, three, four, five, six, or more vehicles). More particularly, loading room 126 of basement 122 can be configured to accommodate at least a portion of one or more vehicles. For example, loading room 126 may be sized such that at least a portion of one or more vehicles 134 can move into the loading room (e.g., via one or more openings 138). While one or more vehicles 134 are within loading room 126, milk from one or more milking parlors 90 can be directed (e.g., with the assistance of gravity and/or one or more pumps) to the vehicles (e.g., without directing the milk to a storage tank).

As shown, livestock portion 14 may include one or more passageways 142 (see FIG. 7, for example) configured to allow personnel (e.g., on foot) and/or vehicle access to various locations within livestock portion. In this embodiment, livestock portion 14 comprises a single passageway 142. In some embodiments, a livestock portion (e.g., 14) may comprise 1, 2, 3, 4, 5, 6, 7, 8, 9, 10, or more passageways.

Passageway 142 can be positioned within livestock portion 14 such that interaction between livestock within the livestock portion and vehicles and/or personnel within the livestock portion is reduced (e.g., as compared to interaction between livestock and vehicles and/or personnel when the vehicles and/or personnel traverse floor 18 of the livestock portion to access the same locations within the livestock portion). By minimizing interaction between livestock and vehicles and/or personnel within livestock portion 14, disruptions in milking operations may be reduced and cow comfort may be increased.

As shown in FIG. 3, for example, at least a portion of passageway 142 is configured to be positioned at an elevation below floor 18 of livestock portion 14. For example, at least a portion of passageway 142 can be positioned at an elevation that is approximately the same elevation as basement 122. In some embodiments, at least a portion of a passageway (e.g., 142) is positioned above an elevation above a basement (e.g., 122) but below an elevation of a floor (e.g., 18) of a livestock portion (e.g., 14). In some embodiments, at least a portion of a passageway (e.g., 142)

is configured to be positioned at an elevation that is approximately the same elevation as a floor (e.g., 18) of a livestock portion (e.g., 14).

Passageway 142 may be configured to extend in any suitable direction between first side 46, second side 50, front side 54, and back side 58 of livestock portion 14. As shown in FIG. 7, passageway 142 extends from back side 58 to basement 122. Passageway 142 can, but is not required to, include a slope. For example, passageway 142 can comprise a slope extending between basement 122 and back wall 74 (e.g., sloping downward from the back wall toward the basement, or vice versa). Passageway 142 can comprise any suitable slope, such as, approximately any one of, greater than approximately any one of, or between any two of, the following: 0.05, 0.1, 0.15, 0.2, 0.25, 0.3, 0.35, 0.4, 0.45, 0.5, 0.6, 0.7, 0.8, 0.9, 1.0, 1.1, 1.2, 1.3, 1.4, 1.5, 1.6, 1.7, 1.8, 1.9, 2.0, 2.25, 2.5, 2.75, 3, 3.5, 4, 4.5, 5, 6, 7, 8, 9, 10, and 15 percent of slope.

Passageway 142 may be sized to accommodate one or more vehicles (e.g., 134) such that the vehicle may drive through the passageway. For example, passageway 142 may comprise a width ranging from approximately 2 feet to approximately 300 feet or more, such as, approximately any one of, greater than approximately any one of, or between approximately any two of, the following: 2, 3, 4, 5, 10, 15, 20, 25, 30, 35 40, 45, 50, 55, 60, 70, 80, 90, 100, 200, 300, 400, and 500 feet. Passageway 142 may comprise a height ranging from approximately 2 feet to 50 feet or more, such as, approximately any one of, greater than approximately any one of, or between approximately any two of the following: 2, 3, 4, 5, 10, 15, 20, 25, 30, 35 40, 45, and 50 feet. Passageway 142 may comprise any appropriate length, such as, approximately any one of, greater than approximately any one of, or between approximately any two of, 5, 10, 20, 30, 40, 50, 60, 70, 80, 90, and 100 percent of a length of a side (e.g., first side 46, second side 50, front side 54, or back side 58) of livestock portion 14.

Passageway 142 can have one or more access openings 146 configured to act as entrances and/or exits to the passageway for vehicles and/or personnel to access livestock portion 14. In this embodiment, passageway 142 includes an access opening 146 at basement 122 such that vehicles and/or personnel can access the passageway via the basement. Passageway 142 (e.g., also) includes an access opening 146 on back side 58 of livestock portion 14 such that vehicles and/or personnel can access the passageway via the exterior of the livestock portion. Passageway 142 may have any suitable number of access openings 146. In this embodiment, passageway 142 includes two access openings 146. In some embodiments, a passageway (e.g., 142) includes 1, 2, 3, 4, 5, 6, 7, 8, 9, 10, or more access openings (e.g., 146).

Passageway 142 includes one or more access tunnels 150 configured to provide access to floor 18, and more particularly, to one or more milking parlors 90, from the passageway. For example, each access tunnel 150 is configured to extend between the passageway and enclosure 98 of milking parlor 90 such that personnel can enter the enclosure from the passageway via the access tunnel. Personnel can access one or more access tunnels 150 of passageway 142 to perform maintenance (e.g., on one or more milking parlors 90), perform veterinary care (e.g., on livestock within livestock portion 14), deliver chemicals (e.g., to one or more milking parlors 90), and/or perform other tasks related to maintaining the structure and/or providing livestock comfort and health. Passageway 142 may have any suitable number of access tunnels 150. In this embodiment, passageway 142 includes 8 access tunnels 150. In some embodiments, a passageway (e.g., 142) includes 1, 2, 3, 4, 5, 6, 7, 8, 9, 10, 11, 12, 13, 14, 15, or more access tunnels (e.g., 150).

Structure 10 can comprise a commodity portion 154 suitable for receiving, mixing, and/or preparing for distribution of feed to livestock within livestock portion 14. One embodiment of commodity portion 154 of structure 10 is depicted in FIG. 9 and FIG. 10. In this embodiment, commodity portion 154 includes a delivery platform 158, a loader platform 162, and a mixing platform 166. Each of delivery platform 158, loader platform 162, and mixing platform 166 cooperate to increase the amount of product that can be delivered at one time and improve loading and mixing efficiencies as described below.

As shown, delivery platform 158 may be configured to accommodate one or more vehicles 170 (e.g., via one or more ramps). For example, delivery platform 158 may include one or more lanes for managing vehicle traffic. Vehicles 170 on delivery platform 158 may be loaded with product, such as, animal fodder (e.g., silage, hay, cotton seed, corn, wheatlage, sorghum, or other bulk commodities, one or more trace minerals, and/or the like). In this embodiment, each vehicle 170 may be configured to unload product within the vehicle onto loader platform 162. For example, delivery platform 158 may comprise one or more openings such that product may be unloaded from the delivery platform onto loader platform 162 through the openings in the delivery platform. In some embodiments, one or more of a delivery platform (e.g., 158), a loader platform 162, and/or a mixing platform (e.g., 166) includes a feed mill configured to receive product that is unloaded from vehicles 170. As shown, commodity portion 154 may have two vehicles 170 or more on delivery platform 158 at one time, one of which may be unloading product onto loader platform 162 and one of which may be entering or exiting the commodity portion. By allowing multiple vehicles 170 on delivery platform 158 at a time, more volume of product and a greater variety of product can be unloaded onto loader platform 162 while reducing a risk of automotive accidents.

In the depicted embodiment, loader platform 162 of commodity portion 154 includes one or more bays 174. As shown, each of bays 174 may be configured to be at least partially disposed beneath delivery platform 158. For example, each of bays 174 may be configured such that product unloaded from vehicles 170 on delivery platform 158 lands in one or more of the bays. As shown, each bay 174 may be separated from an adjacent bay 174 by a partition 178 such that product within each bay does not comingle. For example, one or more partitions 178 may extend from loader platform 162 to delivery platform 158. In this embodiment, loader platform 162 may be configured to accommodate one or more loader vehicles 176 (e.g., an automated and/or user-operated pay loader, and/or the like). Loader vehicles 176 may be configured to move product from one or more bays 174 to mixing platform 166.

Mixing platform 166 may be configured to accommodate one or more (e.g., central and/or mobile) mixers 182. As shown, mixing platform 166 may be laterally and vertically spaced from delivery platform 158. More particularly, in this embodiment, mixing platform 166 may be disposed at an elevation below an elevation of loader platform 162 and/or an elevation of delivery platform 158. For example, mixing platform 166 may be disposed from approximately two (2) feet to approximately sixteen (16) feet or more (e.g., approximately 2, 3, 4, 5, 6, 7, 8, 9, 10, 11, 12, 13, 14, 15, 16 feet or more) below loader platform 162. By providing mixing platform 166 that is below loader platform 162, loader vehicles 176 can more quickly and/or precisely move product into mixers 182 (e.g., as compared to having to raise and dump product when the vehicles and the mixers are on the same platform).

As shown, commodity portion 154 is coupled to livestock portion 14 via a commodity passageway 186. In this embodiment, commodity passageway 186 may include sidewalls and/or a roof such that the commodity passageway is at least partially isolated from air outside of structure 10. In some embodiments, a commodity passageway (e.g., 186) of a structure (e.g., 10) is open to air outside of the structure. In some embodiments, a commodity portion (e.g., 154) is directly adjacent to a livestock portion (e.g., 14) of a structure (e.g., 10) such that a commodity passageway (e.g., 186) can be omitted.

In the depicted embodiment, livestock portion 14 may include an automated feed delivery system 190. Feed delivery system 190 may be similar in operation to a streetcar system. For example, feed delivery system 190 may comprise a guide track 194 configured to guide one or more feed delivery vehicles 198 about floor 18 of livestock portion 14 such that the feed delivery vehicle can deliver suitable portions of feed to the livestock. At least a portion of guide track 194 may be positioned at an elevation above floor 18, and more particularly, above one or more feed lanes 106. Guide track 194 may comprise a track, such as, a metal rail, a wire track, and/or the like. In this embodiment, guide track 194 comprises a predetermined path (e.g., as indicated by directional arrows 202). In other embodiments, a guide track (e.g., 194) may guide movement of one or more feed delivery vehicles (e.g., 198) along an improvised path. In this embodiment, guide track 194 is coupled to roof 22. Each feed delivery vehicle 198 may be coupled to guide track 194 via one or more shafts and/or cables. At least because roof 22 is substantially parallel to floor 18, feed delivery vehicle 198 is able to maintain being coupled with guide track 194 on roof 22 (e.g., via one or more shafts and/or cables) as the vehicle moves about the floor. Further, by controlling movement of feed delivery vehicle 198 from above the vehicle, feed delivery system 190 reduces a risk of communication loss between guide track 194 and the feed delivery vehicle (e.g., as compared to feed delivery systems having a guide track (e.g., 194) on a floor (e.g., 18) of a livestock portion (e.g., 14), which may become obstructed due to dirt, feed, and/or the like on the guide track).

Guide track 194 may be configured to transmit signals (e.g., electrical signals, radio signals, magnetic signals, and/or the like) to feed delivery vehicle 198, which can provide instructions regarding the feed delivery vehicle's movement (e.g., instructions regarding a position, a velocity, an acceleration, and/or the like of the feed delivery vehicle), instructions regarding feed delivery (e.g., volume and/or weight of feed delivered), and/or the like. In some embodiments, movement of a feed delivery vehicle (e.g., 198) can be configured to be controlled using a global positioning system (GPS).

Movement of feed delivery vehicle 198 may be automated (e.g., based on a predefined schedule of feeding and/or a preprogrammed layout of livestock portion 14) and/or user-controlled (e.g., via personnel in one or more utility rooms 130).

In this embodiment, feed delivery vehicle 198 may be loaded with feed within commodity portion 154 (e.g., on loader platform 162 and/or on mixing platform 166) and subsequently move along guide track 194 to distribute feed to livestock within livestock portion 14. For example, feed delivery vehicle 198 may move in a snake-like pattern along guide track 194 (e.g., as indicated by directional arrows 202) to distribute feed along feed lanes 106. When feed delivery vehicle 198 has completed distributing feed in feed lanes 106, the feed delivery vehicle may move along guide track 194 to return to commodity portion 154 (e.g., to be reloaded with feed).

Figure 12:
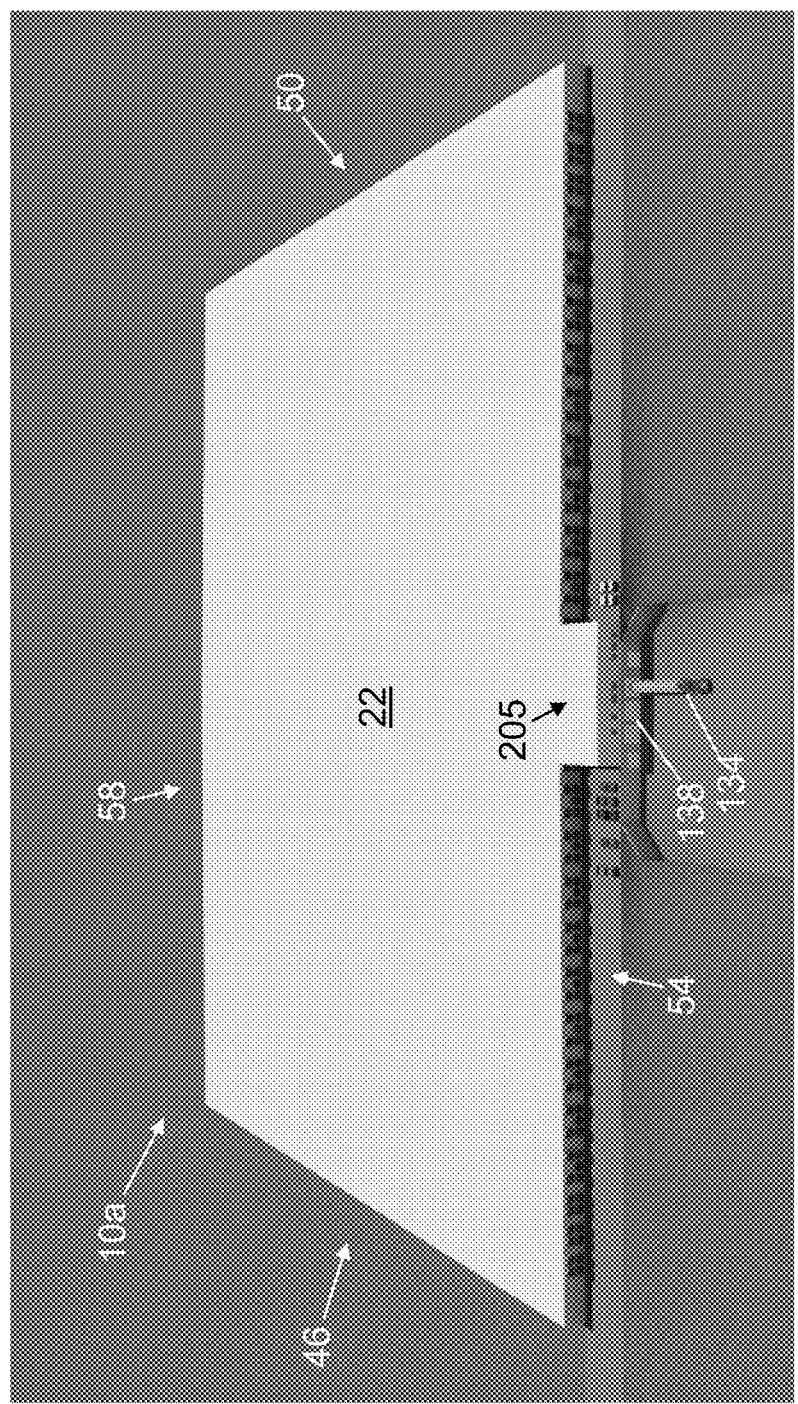
FIGS. 12 and 13 depict first and second perspective views, respectively, of a second embodiment of the present structures, shown with an administrative portion.
Figure 13:
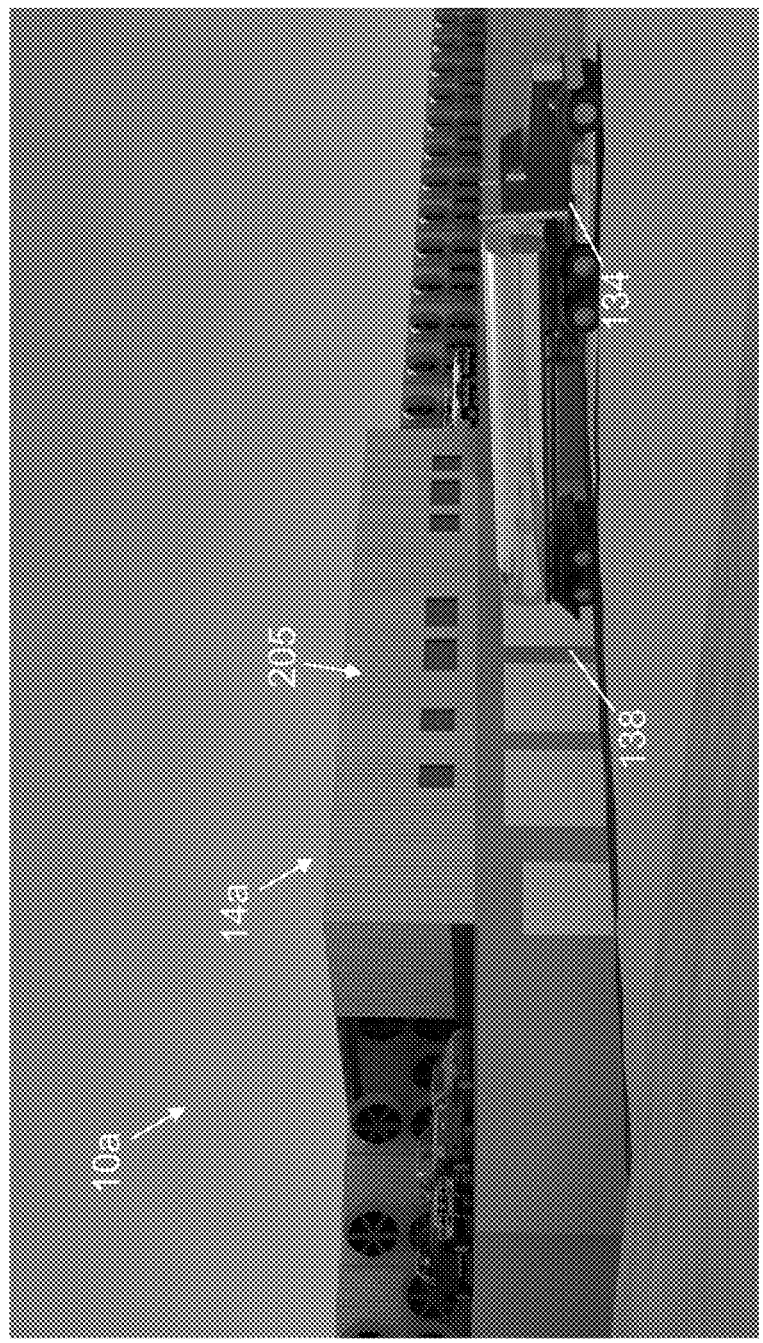

FIG. 12 and FIG. 13 are perspective illustrations of a second embodiment of the present structures designated as structure 10*a*. Structure 10*a* can be substantially similar to structure 10, with the primary exceptions described blow. Livestock portion 14*a* of structure 10*a* includes an administrative portion 205 at front side 54 of the livestock portion. Administrative portion 205 may be configured to accommodate personnel, office furniture and equipment, and/or the like, which may be needed to operate and maintain structure 10.

Figure 14:
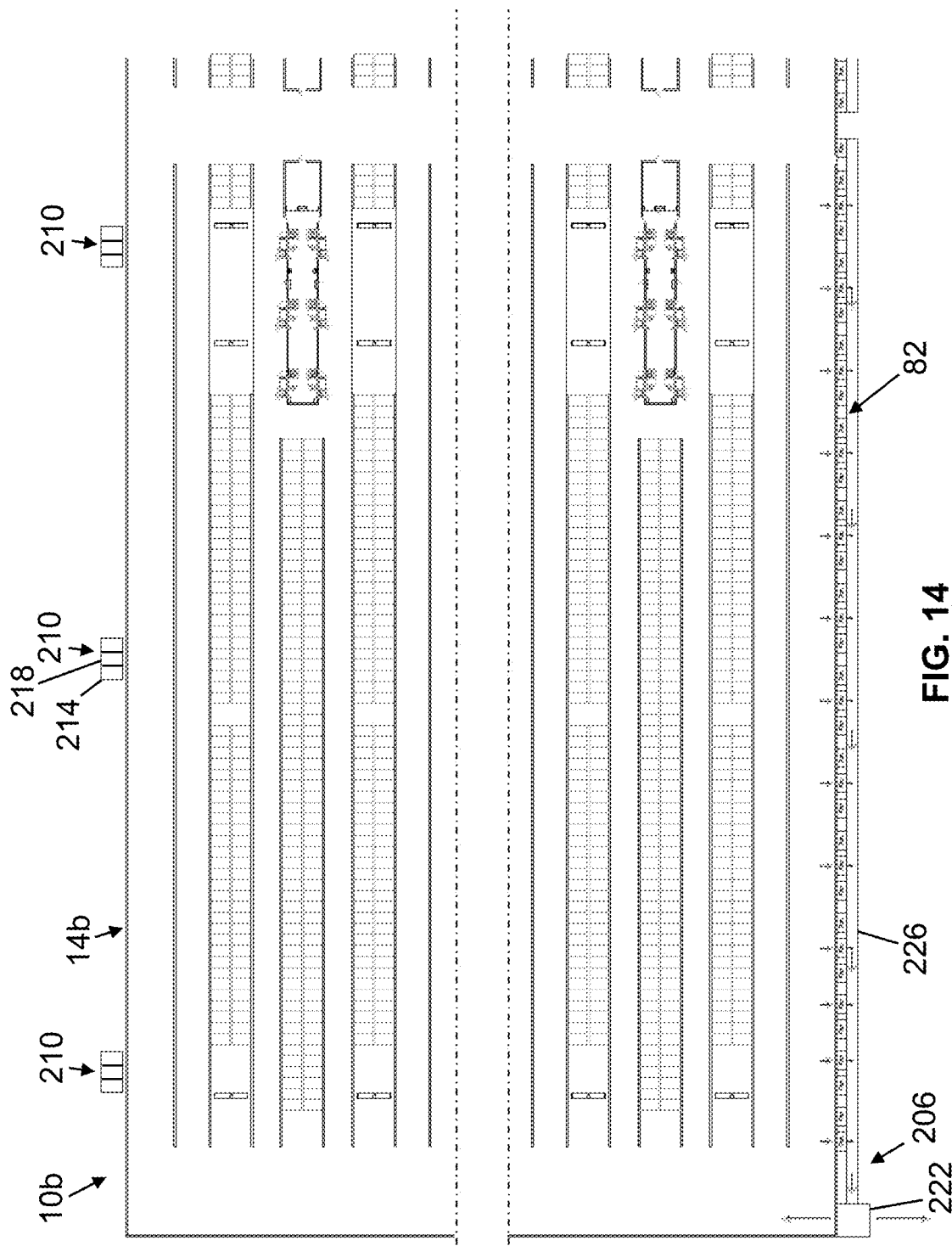
FIG. 14 depicts a third embodiment of the present structures, shown with an air regulation system that may be suitable for use with some embodiments of the present structures.

Referring now to FIG. 14, shown therein and designated by the reference numeral 10*b* is a third embodiment of the present structures. Structure 10*b* can be substantially similar to structure 10, with the primary exceptions described blow. Livestock portion 14*b* of structure 10*b* includes an air regulating system 206 to assist in controlling air conditions (e.g., temperature, humidity, air flow, air quality, and/or the like) within the livestock portion. For example, air regulating system 206 may comprise a heating, ventilation and air conditioning (HVAC) system.

In this embodiment, air regulating system 206 comprises one or more air handlers 210, each having one or more of the following: a blower 214, one or more heating and/or cooling elements 218, one or more filter racks or chambers, one or more sound attenuators, and one or more dampers. In the depicted embodiment, air regulating system 206 comprises one or more fans 82. In this embodiment, one or more air handlers 210 can each serve as an air inlet to allow air to enter livestock portion 14 and one or more fans 82 can serve as an air outlet (e.g., the fans can be in fluid communication with an air scrubber 222, a discussed below, and/or in fluid communication with an exhaust vent) to allow air to exit the livestock portion.

As shown, air regulating system 206 may include an air scrubber 222 configured to purify air exhausted from livestock portion 14*b*. For example, air scrubber 222 may comprise one or more solvents to capture methane exhausted from livestock portion 14*b*. In this embodiment, air regulating system 206 includes one or more ducts 226 configured to convey to air scrubber 222 air that is exhausted by one or more fans 82. For example, one or more blowers 214 of one or more air handlers 210 may be configured to cooperate with one or more ducts 226 to urge air within the ducts toward air scrubber 222. In the depicted embodiment, methane captured by air scrubber 222 may be utilized in an air unit to at least partially power air regulating system 206. In this embodiment, air scrubber 222 may be configured to reintroduce air suitable for breathing into livestock portion 14*b* (e.g., after sufficiently capturing the methane and otherwise treating the air exhausted by one or more fans 82). Air reintroduced into livestock portion 14*b* may be heated and/or cooled by one or more air handlers 210 (e.g., via one or more heating and/or cooling elements 218) before being reintroduced into the livestock portion.

In some embodiments, an air scrubber (e.g., 222) is omitted from an air regulating system (e.g., 206), and, as such, air exhausted by one or more fans (e.g., 82) is released into the atmosphere. In these embodiments, because methane is not captured and/or utilized to power an air regulating system (e.g., 206), conventional methods of powering the air regulating system are needed (e.g., electrical energy, energy from natural gas, hydroelectric energy, and/or the like). In some embodiments, one or more heating and/or cooling elements (e.g., 218) of one or more air handlers (e.g., 210) may be configured to cool and/or heat air being flowing into a livestock portion (e.g., 14*b*).

The present disclosure also includes modifying and/or supplementing existing structures (e.g., an open lot structure, a Saudi-style barn, a natural ventilation barn, a forced ventilation barn, and/or the like) to comprise one or more features described in this disclosure. Any existing structure can be modified and/or supplemented with one or more of the features described herein, such as those depicted in FIGS. 1-14 or described with respect thereto. For example, any one of floor 18, roof 22, fans 82, basement 122, passageway 142, feed delivery system 190, air regulation system 206, and/or the like, and any features related thereto can be added to an existing structure (e.g., an open lot structure, a Saudi-style barn, a natural ventilation barn, a forced ventilation barn, and/or the like) to provide one or more of the advantages described herein with respect to structures 10, 10*a*, and 10*b*.

As used herein, an "open lot" structure generally includes one or more parlors, one or more outdoor holding pens, a fence, a feed manger, and water troughs. In some environments, such as cold or windy climates, an open lot can include partitions (e.g., windbreaks) to provide protection for livestock. In other environments, such as hot climates, an open lot can include a covering (e.g., steel shades, impermeable cloth, permeable fabric, and/or the like) to provide protection from heat for the livestock. Some open lots may include both windbreaks and shading structures.

As used herein, a "Saudi-style barn" can include any of the features of an open lot and additionally includes a covering over a portion of a livestock pen, for example, approximately one quarter of the livestock pen, to cover the feed manger and water troughs to provide protection for livestock from the heat. For example, the covering traditionally includes a steel structure with a gable or double-sloped roof to allow heat to rise to an open ridge and/or center of the structure to escape. Saudi-style barns can include fans and/or misters (e.g., including high pressure mist introduced in front of the fans that blow from the roof toward livestock within the structure), such as over the feed manger and/or water troughs.

The existing structures can also include a natural ventilation barn and/or a forced ventilation barn, each of which can include livestock beds and holding and/or exercise pens, can provide covering over the full area in which livestock sleeps, eats, and drinks, such as over the feed manger and water troughs. These existing natural and/or forced ventilation barns can include multiple variations, such as, a cross-vent barn, tunnel-vent barns, and/or a structure (e.g., 10, 10*a*, 10*b*) as shown and described herein. These existing natural and/or forced ventilation barns can include individual stalls for livestock that have sand, manure compost, and/or mattresses. Individual stalls can be divided by free-stall loops (e.g., metal loops separated by approximately 4 feet). In some embodiments, existing natural ventilation barns may not include sidewalls, which permits natural air to move through the barn to cool livestock. In such an embodiment, these existing natural ventilation barns can include partitions (e.g., windbreaks and/or curtains) that can be lowered along the side to protect livestock in the barn from undesirable weather, such as rain, cold, wind, or heat. In other embodiments, existing forced ventilation barns can include sidewalls, and fans can be coupled at one end of the structure, such that the fans can be activated to remove air from the structure, thus drawing air through the barn to engage and cool livestock. In some embodiments, the fans are coupled to the sidewalls such that air is drawn through the barn from sidewall to sidewall. In some embodiments, existing natural and/or forced ventilation barns can include misters (e.g., high pressure misters). These existing natural and/or forced ventilation barns can comprise a concrete floor, and natural ground or dirt for individual stalls.

For example, modifying and/or supplementing an existing structure may allow the structure to accommodate a larger number of livestock and can provide the existing structure one or more of the following functions: livestock housing, veterinary care, milk extraction, milk processing, milk loading, milk storage, feed delivery, utility management, and/or other functions. By modifying and/or supplementing the existing structure with these accommodations and/or functions, an overall footprint of the modified and/or supplemented structure can be minimized. Further, as described herein, the positioning of one or more of these important operational functions within the modified and/or supplemented structure and/or the physical features of the modified and/or supplemented structure and the related methods can be configured to provide improved operational efficiencies, such as, efficiencies in cooling and/or heating air within the structure, efficiencies in precipitation collection, efficiencies in waste management, efficiencies in delivering, loading, and/or mixing commodity from a delivery vehicle and/or efficiencies in constructing the structure. The positioning of one or more of these important operational functions within the modified and/or supplemented structure and/or the physical features of the modified and/or supplemented structure and the related methods can also result in reduced human interaction with livestock, thereby improving livestock comfort, which is important to a profitable, well-run livestock operation. Further, the physical features of the modified and/or supplemented structure and the related methods allow for the modified and/or supplemented portion of the structure to be built on previously unsuitable typography.

The present disclosure further includes methods, such as methods of making a structure (e.g., 10, 10*a*, 10*b*). Such methods can comprise installing one or more supporting structures (e.g., 42) into the ground and coupling a roof (e.g., 22) to the one or more supporting structures. The methods can comprise, after coupling the roof (e.g., 22) to the one or more supporting structures (e.g., 42), one or more of the following: providing a floor (e.g., 18) beneath the roof, installing one or more milking parlors (e.g., 90) beneath the roof, installing one or more livestock beds (e.g., 102) beneath the roof, installing one or more walking lanes (e.g., 110) beneath the roof, installing one or more holding pens (e.g., 118) beneath the roof, installing one or more feed lanes (e.g., 106) beneath the roof.

In operation, structure 10 can be used as follows. For example, livestock can be held within livestock beds 102 and air quality and/or movement can be controlled (e.g., from basement 122). A commodity truck (e.g., 170) can deliver commodity (e.g., feed) to commodity portion 154 of structure 10. Thereafter, a mixer (e.g., within commodity portion 154) can mix the feed and place the feed into one or more feed delivery vehicles 198. One or more feed delivery vehicles 198, guided by guide track 194, move through one or more feed lanes 106 within structure 10 and distribute feed onto the feed lanes. When a head of livestock decides to be milked, it can leave its livestock bed 102 and walk to holding pen 118 (e.g., which may be accessible via walking lane 110). When a milking station 94 of milking parlor 90 becomes available, livestock can move into the milking station and milking may begin. Next, milk from milking parlor 90 is directed to basement 122. For example, milk from milking parlor 90 may be directed to one or more vehicles (e.g., 134) that are at least partially disposed within basement 122 (e.g., within loading room 126). In some embodiments, milk from milking parlor 90 may be directed to one or more storage tanks located within basement 122 (e.g., within one or more utility rooms 130). If milking parlor 90 requires maintenance, personnel (e.g., within a vehicle and/or on foot) can access the milking parlor via passageway 142. For example, personnel and/or vehicle(s) may enter passageway 142 via access opening 146 at basement 122 and/or access opening 146 at back side 58. Personnel may enter enclosure 98 of milking parlor 90 via access tunnel 150 (e.g., while livestock continue to be milked at the milking parlor). In this way and others, personnel are able to minimize interaction with livestock while performing maintenance. If a head of livestock requires medical attention, personnel may also use one or more access tunnels 150 of passageway 142 to enter floor 18 and provide medical treatment.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present structures and methods are not intended to be limited to the particular forms disclosed. Rather, they include all modifications and alternatives falling within the scope of the claims, and embodiments other than the ones shown may include some or all of the features of the depicted embodiments. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A livestock structure, comprising:
a floor comprising a non-zero slope, wherein the floor is configured to support livestock housing;
a roof, wherein a majority of the roof is substantially parallel to the floor;
one or more supporting structures configured to support the roof;
an air management system to provide ventilation to the structure;
a guide track coupled to a portion of the roof that is substantially parallel to the floor, wherein the guide track is configured to guide movement of one or more feed delivery vehicles about the floor; and
a passageway extending a majority of a distance between a first side and an opposing second side of the structure, wherein the passageway is positioned at an elevation that is below an elevation of the floor.

2. The livestock structure of claim 1, wherein the floor includes a first portion having a first slope and a second portion having a second slope.

3. The livestock structure of claim 2, wherein the first slope and the second slope are substantially equal and extend in opposite directions.

4. The livestock structure of claim 2, wherein one of the first slope and the second slope comprises 0.1 to 0.25 percent of slope.

5. The livestock structure of claim 1, comprising a basement configured to accommodate at least a portion of one or more vehicles.

6. The livestock structure of claim 5, wherein the basement is positioned at an elevation that is below the elevation of the floor.

7. The livestock structure of claim 6, wherein the passageway is positioned at substantially the same elevation as the basement.

8. The livestock structure of claim 1, comprising a plurality of milking parlors on the floor, and wherein the plurality of milking parlors are positioned at least partially beneath the roof.

9. The livestock structure of claim 8, wherein the passageway is configured to provide access to one or more of the plurality of milking parlors on the floor.

10. The livestock structure of claim 9, wherein the passageway is sized to accommodate one or more humans such that the human can access the milking parlors via the passageway.

11. The livestock structure of claim 1, wherein the passageway comprises:
a height from 2 feet to 20 feet; and
a width from 4 feet to 300 feet.

12. The livestock structure of claim 1, wherein the air management system comprises:
a plurality of fans configured such that, when activated, the plurality of fans remove air from the structure; and
a heating and/or cooling element configured to heat and/or cool air that flows into the structure.

13. The livestock structure of claim 12, wherein the plurality of fans are configured to cause air to flow into the structure.

14. The livestock structure of claim 12, wherein the air management system comprises an air scrubber configured to separate methane from air removed from the structure by the plurality of fans.

15. The livestock structure of claim 14, wherein the air management system comprises an air unit configured to receive the methane and at least partially power the heating and/or cooling element and/or the plurality of fans.

16. The livestock structure of claim 14, wherein the air scrubber is configured to direct air suitable for breathing into the structure.

17. The livestock structure of claim 16, wherein the heating and/or cooling element is configured to heat and/or cool the air suitable for breathing.

18. The livestock structure of claim 14, comprising a blower configured to urge air removed by the plurality of fans to the air scrubber.

19. The livestock structure of claim 1, wherein the guide track is configured to be coupled to the one or more feed delivery vehicles while the guide track guides movement of the one or more feed delivery vehicles about the floor.

20. The livestock structure of claim 1, wherein the guide track is configured to guide movement of the one or more feed delivery vehicles along a predetermined path.

21. The livestock structure of claim 1, wherein the guide track is configured to guide movement of the one or more feed delivery vehicles along an improvised path.

22. A livestock structure, comprising:
- a floor comprising a non-zero slope, wherein the floor is configured to support livestock housing;
- a roof, wherein a majority of the roof is substantially parallel to the floor;
- one or more supporting structures configured to support the roof;
- an air management system to provide ventilation to the structure, wherein the air management system comprises:
    - a plurality of fans configured such that, when activated, the plurality of fans remove air from the structure;
    - an air scrubber configured to separate methane from air removed from the structure by the plurality of fans;
    - a heating and/or cooling element configured to heat and/or cool air that flows into the structure;
    - an air unit configured to receive the methane and at least partially power the heating and/or cooling element and/or the plurality of fans; and
- a passageway extending a majority of a distance between a first side and an opposing second side of the structure, wherein the passageway is positioned at an elevation that is below an elevation of the floor.

23. The livestock structure of claim 22, wherein the plurality of fans are configured to cause air to flow into the structure.

24. The livestock structure of claim 22, wherein the air scrubber is configured to direct air suitable for breathing into the structure.

25. The livestock structure of structure 24, wherein the heating and/or cooling element is configured to heat and/or cool the air suitable for breathing.

26. The livestock structure of claim 22, comprising a blower configured to urge air removed by the plurality of fans to the air scrubber.

* * * * *